United States Patent [19]

Aikawa et al.

[11] Patent Number: 4,739,235
[45] Date of Patent: Apr. 19, 1988

[54] PROFILE CONTROL APPARATUS FOR THERMAL WORKING MACHINE

[75] Inventors: Atsushi Aikawa, Isehara; Akira Sengoku, Yokohama, both of Japan

[73] Assignee: Amada Company, Limited, Japan

[21] Appl. No.: 933,163

[22] Filed: Nov. 21, 1986

[30] Foreign Application Priority Data

Nov. 21, 1985 [JP] Japan ................ 60-259806

[51] Int. Cl.$^4$ .................................. G05B 17/36
[52] U.S. Cl. .................... 318/576; 318/608; 219/121 EU
[58] Field of Search ............. 219/121 EU, 121 EX; 318/575, 576, 608

[56] References Cited

U.S. PATENT DOCUMENTS

| | | | |
|---|---|---|---|
| 3,863,124 | 1/1975 | Pierce et al. | 318/576 |
| 3,970,911 | 7/1976 | Schmall | 318/607 |
| 4,276,503 | 6/1981 | Peiffert et al. | 318/576 |
| 4,458,190 | 7/1984 | Takawashi et al. | 318/607 XP |
| 4,560,880 | 12/1985 | Petrie et al. | 219/121 E X |
| 4,571,479 | 2/1986 | Maeda et al. | 318/576 |

Primary Examiner—Benjamin Dobeck
Attorney, Agent, or Firm—Wigman & Cohen

[57] ABSTRACT

In a thermal cutting machine provided with an NC system of the type having a manual pulse generator allowing the operator to manually adjust the working head height from a workpiece a profile control apparatus is provided to maintain a reference distance between the head and a non-flat workpiece. The profile control apparatus is installed in the cutting machine, by adding only a head distance sensor and a Z-axis controller in parallel with the manual pulse generator via a selector switch. The Z-axis controller generates a pulse signal having a frequency proportional to a differential voltage between a reference head height determined by the NC system and an actual head height detected by the head distance sensor to correct the reference head height from the non-flat workpiece. The V-F conversion characteristics of the Z-axis controller are of Z-type, in particular, to reduce the profile error.

10 Claims, 6 Drawing Sheets

PROFILE CONTROL APPARATUS FOR THERMAL WORKING MACHINE

BACKGROUND OF THE INVENTION

1. Field of the Invention

The present invention relates to a profile control apparatus for a thermal working machine, and more specifically to a profile control apparatus incorporated with an NC system for a thermal cutting machine.

2. Description of the Prior Art

In thermal working machines such as a laser or gas cutting machine, a flat workpiece mounted on a table is cut off by a working head kept at a predetermined height over the workpiece. In general, however, since there inevitably exists a warp in a flat workpiece, a profile control apparatus is required to maintain the working head at a predetermined distance away from the surface of a non-flat workpiece. This is because the laser beam should always be condensed (focused) at the middle of the thickness of the workpiece having a warp, for instance.

Conventionally, however, the profile control apparatus has been provided independently from an NC system which controls workpiece positions and a working head position. In the conventional profile control apparatus, the working head is so controlled as to be maintained at a predetermined constant distance away from a non-flat workpiece in response to an analog sensor signal indicative of an actual distance between the head and the workpiece.

On the other hand, in the thermal working machines provided with an NC system, a manual pulse generator is usually provided for manually moving the working head along the Z axis by a desired distance. In addition, a pulse signal processor is also incorporated with the NC system in order to drive the head along the Z-axis in response to a pulse signal generated from the manual pulse generator according to the rotational speed of a knob disposed in the manual pulse generator.

In the conventional thermal working machines, since the profile control apparatus is provided independently from the NC system and therefore the working head is controllably driven by the NC system and the profile control apparatus, independently, there exists a problem in that the head drive mechanism is relatively complicated and therefore costly.

Further, where a profile control apparatus is additionally installed on an already-completed thermal working machine provided with an NC system, since the NC system should inevitably be modified, there exists another problem in that a relatively great labor is required and therefore the cost required for the modification is high.

SUMMARY OF THE INVENTION

With these problems in mind, therefore, it is the primary object of the present invention to provide a profile control apparatus for a thermal working machine such that the profile control apparatus can readily be installed on an already-completed thermal working machine without modifying the NC system and also the head driving mechanism.

To achieve the above-mentioned object, the profile control apparatus for a thermal working machine for automatically maintaining a distance between a working head and a non-flat workpiece at a constant reference distance, according to the present invention comprises: (a) an NC system for determining a manual working head height from the workpiece in response to a manual pulse signal generated by a manual pulse generator in manual mode and a reference working head height from the workpiece in response to a reference head height command signal generated by a central controller of the NC System in automatic mode; (b) sensor means for detecting an actual distance between the head and the workpiece; and (c) Z-axis controller means for generating a pulse signal having a frequency proportional to a differential voltage between the reference head height determined by the central controller and the actual distance detected by said sensor means and applying the generated signal to a pulse signal generator of said NC system to correct the reference head height so that the actual distance between the head and the non-flat workpiece is automatically regulated to the constant reference distance.

In the profile control apparatus according to the present invention, it is possible to provide the NC system with a profile control function by additionally installing only sensor means and Z-axis controller means to the NC system. This is because the pulse signal processor is already provided for the NC system so as to be connectable to the manual pulse generator. In other words, the pulse signal processor is selectively used in common for the manual pulse generator and the automatic Z-axis controller means for the profile control apparatus according to the present invention.

Figure 8:
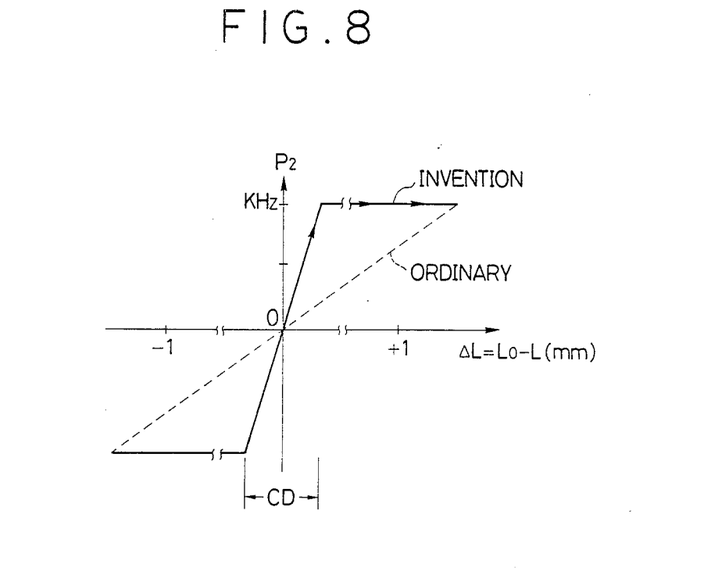
FIG. 8 is a graphical representation showing the frequency characteristics of the pulse signal P2 generated from the pulse controller with respect to a distance from the reference value.

The Z-axis controller means comprises (a) a differential voltage detector for calculating a difference between the reference distance and the actual distance in voltage level; and (b) a pulse signal generator for generating a pulse signal having a frequency proportional to the calculated differential voltage, the generated pulse signal being integrated for each unit time by a pulse signal processor of said NC system to obtain a head height movement signal to be applied to a head height controller of said NC system. In a second embodiment of the present invention, the Z-axis controller means is provided with upper limit presetting means, lower limit presetting means, direction discriminating means, and profile control distance range presetting means. In particular, the pulse signal generator according to the present invention comprises (a) a voltage-frequency converter for generating a pulse signal with a frequency proportional to the calculated differential voltage at a high proportional constant and (b) a Zener diode for limiting the frequency when the differential voltage exceeds a predetermined value within the controllable distance range in order to provide the V-F characteristics of Z type as shown in FIG. 8. As a result, it is possible to provide a profile control apparatus such that the profile error can be reduced markedly.

BRIEF DESCRIPTION OF THE DRAWINGS

The features and advantages of the profile control apparatus for a thermal working machine according to the present invention will be more clearly appreciated from the following description of the preferred embodiments taken in conjunction with the accompanying drawings in which like reference numerals designate the same or similar elements or sections throughout the figures thereof and in which:

FIG. 4(a) and (b) are waveform diagrams showing two phase-shifted rectangular pulse trains generated from an encoder provided in the manual pulse generator;

FIGS. 4(c) and 4(d) are waveform diagrams showing two impulse signals generated from the manual pulse generator;

DETAILED DESCRIPTION OF THE PREFERRED EMBODIMENTS

Figure 1:
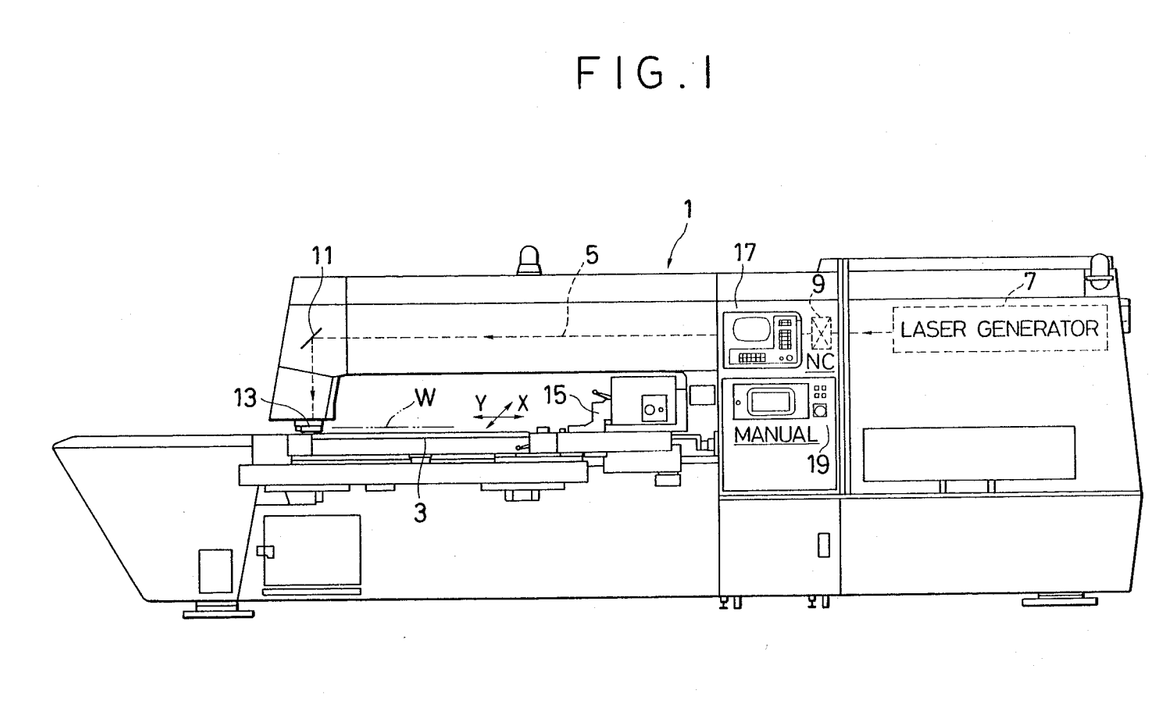
FIG. 1 is a side view of a laser cutting machine to which the profile control apparatus according to the present invention is applied.
Figure 2:
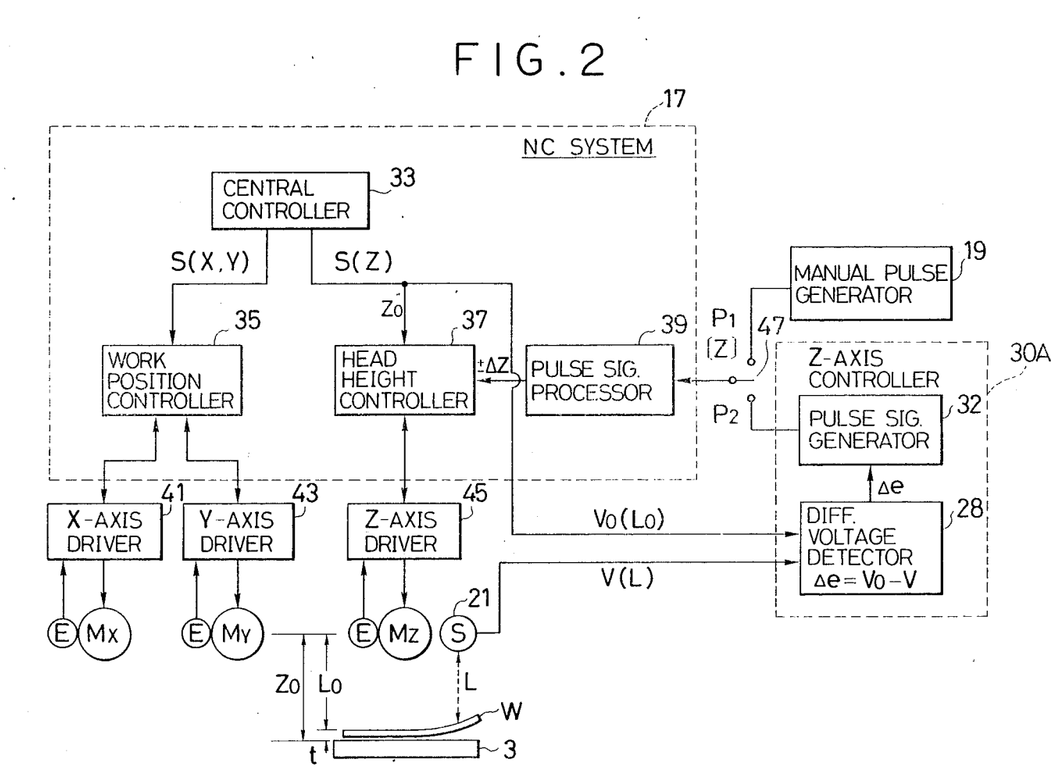
FIG. 2 is a schematic block diagram shown an NC system and a first embodiment of the profile control apparatus according to the present invention.

With reference to the attached drawings, embodiments of the profile control apparatus according to the present invention will be described, by taking the case where the control apparatus is incorporated with an NC system for a laser cutting machine. FIG. 1 shows a side view of a laser cutting machine; and FIG. 2 is a block diagram showing an NC system and a first embodiment of the profile control apparatus according to the present invention in combination.

In a laser cutting machine 1 shown in FIG. 1, a workpiece W is movably guided on a fixed X-Y table 3 laid horizontally, and melted off by the thermal energy of a laser beam 5.

The laser beam 5 is generated by a laser beam generator 7 and guided to a working head 13 by way of an intensity regulator 9 and a reflecting mirror 11. Within the working head 13, a condenser lens (not shown) is provided so that the laser beam 5 can be focused at a position of a predetermined distance (e.g. 1.5 mm) down away from the lower surface of the head 13 to cut off the workpiece W by melting it.

The workpiece W is clamped by a clamp 15 and moved to and fro horizontally on the X-Y table 3 so that a cut-off position of the workpiece W is brought to just under the head 13 by means of X- and Y-axis control servomotors. Further, the head 13 is moved up and down by means of a Z-axis control servomotor.

The laser cutting machine 1 is provided with an N-C system 17, and the NC system includes an encoder knob 19 arranged in an operation panel of the manual pulse generator.

As shown in FIG. 2, the NC system 17 is composed of a central controller 33, a workpiece (clamp) position controller 35, a head height controller 37, and a pulse signal processor 39. The central controller 33, including a CPU, ROM, RAM, etc., outputs various command signals to each of the above controllers in accordance with control programs stored in the ROM. Being connected to various interfaces, the central controller 33 executes various controls required for the cutting machine. However, in FIG. 2 the central controller 33 is assumed to output only a workpiece position command S (X, Y) and a head height command S (Z). In response to the position command S (X, Y), the clamp position controller 35 moves the clamp 15 to and fro through X- and y-axis drivers 41 and 43 and servomotors MX and My, so that the workpiece W can be cut off into a predetermined shape. In response to the height command S (Z), the head height controller 37 moves the head 13 up and down through a Z-axis driver 45 and a servomotor $M_Z$, so that a reference height $Z_o$ can be maintained relative to the fixed table 3 when assumption is made that there exists no warp in the workpiece W. Here, the head height $Z_o$ can be expressed as $Z_o = L_o + t$ where t denotes a workpiece thickness and $L_o$ denotes a distance between the upper surface of a flat workpiece and the head 13. The clamp position controller 35 receives a command signal S (X, Y) from the central controller 33, interpolates each S(X) or S(Y) of the signals, independently, and outputs the interpolated signals to the X- and Y-axis drivers 41 and 43, respectively, as drive command signals. These drivers 41 and 43 are each composed of a servoamplifier, respectively, so that two X- and Y-axis control servomotors Mx and My are driven in response to the drive command signals. An encoder E is provided for each servomotor Mx or My to feedback a positional data to each of the drivers 41 and 43, so that the workpiece W (clamp 15) can be controlled at a target X-Y position at a predetermined speed.

The head height controller 37 receives a command signal S(Z) from the central controller 33, and outputs the signal to the Z-axis driver 45 as a drive command signal.

Similarly, the Z-axis driver 45 is composed of a servoamplifier so that a Z-axis control servomotor $M_Z$ is driven in response to the drive command signal. An encoder E is also provided for the servomotor $M_Z$ to feedback a positional data to the driver 45. When a profile control operation starts, the head 13 is quickly lowered to a position a short distance above from the reference height $Z_o$ and then slowly lowered to the reference height $Z_o$.

To the pulse signal processor 39, a manual pulse generator 19 and a Z-axis controller 30A according to the present invention are selectively connected via a switch 47. The Z-axis controller 30A comprises a pulse signal generator 32 and a differential voltage detector 28.

In addition, a position sensor S such as an optical sensor or an eddy current sensor is attached to the head 13 as shown in FIG. 1 to detect an actual distance L between the workpiece W and the head 13 in the form of a voltage V. On the basis of a detected voltage signal V(L) from the position sensor S and a height command signal S(Z) or $V_o(L_o)$ from the central controller 33, the differential voltage detector 28 obtains a differential voltage $\Delta e = V_o - V$, and outputs the differential voltage $\Delta e$ to the pulse signal generator 32 in analog fashion, where $V_o$ represents a voltage indicative of the reference distance $L_o$ and V represents a voltage indicative of an actual measured distance L.

Figure 3A:
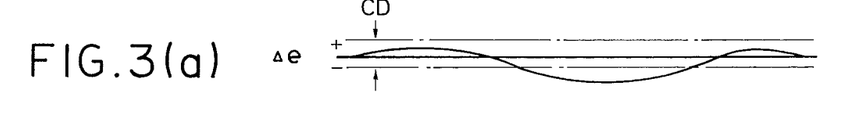
FIG. 3(a) is a waveform diagram showing a differential voltage obtained by the differential voltage detector.

FIG. 3(a) shows a waveform example of the differential voltage $\Delta e$, where (+) indicates that V is lower than $V_o$ (the distance is too short) and (−) indicates that V is higher than $V_o$ (the distance is too long), and further CD indicates a controllable distance range.

Figure 3B:
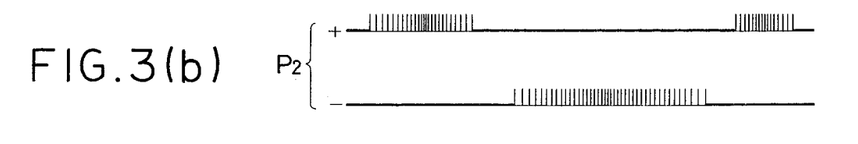
FIG. 3(b) is a waveform diagram showing a pulse signal V-F converted by the pulse signal generator.

The differential voltage $\Delta e$ is supplied to the pulse signal generator 32 for generating a pulse signal $P_2$ with frequency proportional to the voltage $\Delta e$. FIG. 3 (b) shows a waveform example of the pulse signal V-F converted by the pulse signal generator 32. The pulse signal generator 32 generates a positive pulse signal $P_2$ when $\Delta e$ is positive ($V < V_o$) (too short) and a negative pulse signal $P_2$ where $\Delta e$ is negative ($V > V_o$) (too long). The above pulse signal $P_2$ can be generated by the use of a integrator and a multivibrator in combination.

For instance, it is possible to generate a pulse signal with a period of 400 $\mu$sec by inputting the differential voltage $\Delta e$ to an integrator, and activating a one-shot multivibrator when the integrated value reaches a predetermined level while resetting (clearing) the multivibrator every predetermined minute time (e.g. 400 $\mu$sec). Further, it is also possible to generate a pulse signal with a period longer than 330 $\mu$sec by using an integrator for generating a pulse signal having a frequency proportional to the differential voltage $\Delta e$ and a frequency limiter for preventing the period of the pulse signal from being reduced below 330 $\mu$sec.

Figures 4A, 4B, 4C:
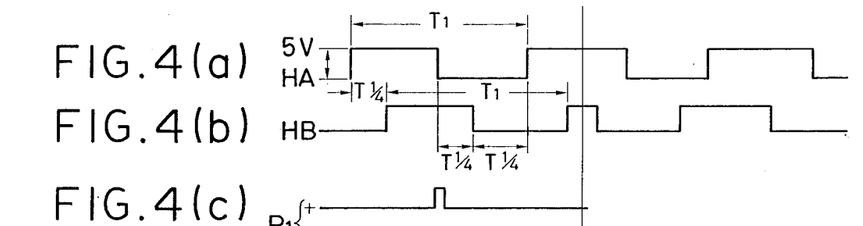
Figure 4D:
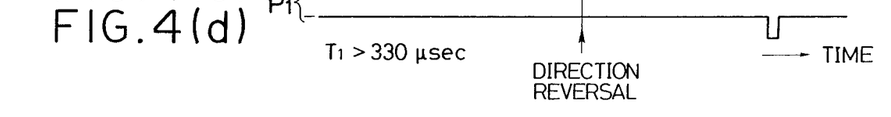

On the other hand, as depicted in FIG. 4, the manual pulse generator 19 is provided with an encoder knob. A first encoder signal HA as shown in FIG. 4(a) is generated when the knob is rotated in the forward direction, while a second encoder signal HB as shown in FIG. 4(b) is generated when rotated in the reverse direction. There is a T/4 (T:period) phase difference between the two signals HA and HB. The manual pulse generator 19 generates a pulse signal $P_1$ (+) as shown in FIG. 4(c) when the knob is rotated in the forward direction and that of $P_1$ (−) as shown in FIG. 4(d) when rotated in the reverse direction by detecting the trailing edge of the pulse HA or HB. Here, the number of pulses $P_1$ per unit time is proportional to the rotational speed of the encoder knob. Further, a frequency limiter is provided to prevent the pulse period from being reduced below 330 $\mu$sec.

The pulse signal processor 39 selectively receives a pulse signal $P_1$ from the manual pulse generator 19 or a pulse signal $P_2$ from the pulse signal generator 32. The processor 39 converts the number of pulses into a distance value (e.g. one pulse is converted into a 1 $\mu$m) by integrating the pulse signals inputted for each predetermined time $\Delta T$ (e.g. 10 msec). The converted correction value is supplied to the head height controller 37 to correct the reference head height $L_o$.

The operation of the profile control apparatus according to the present invention will be described hereinbelow. When the switch 47 is set to the manual pulse generator 19, since this switch motion is linked with an NC mode selection switch (not shown), the NC system is set to the manual mode. Here, when the operator rotates the encoder knob of the manual pulse generator 19, the generator 19 outputs a positive or negative pulse signal $P_1$ as shown in FIGS. 4(c) and (d).

The pulse signal processor 39 integrates the generated pulses $P_1$ for each unit time $\Delta T$ to form a head height movement command $\pm \Delta Z$. This command is applied to the head height controller 37.

At present, since the NC system is set to the manual mode, no command signal S(Z) is applied to the head height controller 37, so that only the movement command $\pm \Delta Z$ is applied to the Z-axis driver 33 as it is. In response to this command signal, the driver 33 drives the servomotor $M_Z$ by a height corresponding to the movement command $\pm \Delta Z$.

When the switch 47 is set to the Z-axis controller 30A, since this switch motion is linked with the NC mode selection switch, the NC system mode is set to the automatic mode.

In this automatic mode, the central controller 33 outputs a height command signal S(Z) to the head height controller 37, so that the head 13 is first lowered down to a position $Z_o - \Delta Z_o$ a little higher than the reference height $Z_o$ and then switched to the profile control operation. Under the profile control operation, the sensor S detects an actual distance L between the head 13 and the workpiece w, so that the differential voltage detector 28 outputs a differential voltage $\Delta e$ corresponding to a difference between the reference distance $L_o$ and the actual distance L.

The pulse signal generator 32 outputs a pulse signal $P_2$ as shown in FIG. 3(b). The pulse signal processor 39 calculates a correction value $\pm \Delta Z$ on the basis of this pulse signal $P_2$ by integrating the number of pulses $P_2$ for each unit time.

If the distance L measured by the sensor S is smaller than the reference distance $L_o$ (i.e. the head position is too low), since $\Delta e$ is positive and therefore the pulse signal $P_2$ is positive, the head height controller 37 receives a positive correction signal $+\Delta Z$ and outputs a driver command signal to move the head 13 in the upward direction. If the distance L is larger than $L_o$, the operation is opposite to the above.

Therefore, the Z-axis controller 30A, the pulse signal processor 39 and the head height controller 37 all operate to keep the correction value $\pm \Delta Z$ at zero; that is, the head 13 is moved up and down so that the distance L between the head and workpiece always matches the reference distance $L_o$.

In the apparatus of the present invention, since the pulse signal processor 39 can be used in common for the manual pulse generator 19 and the z-axis controller 30A, it is possible to simply realize the NC system provided with the profile control apparatus. That is to say, where the NC system includes the manual pulse generator 19 and the pulse signal processor 39, it is possible to add the profiling function to the NC system 17 by additionally installing the sensor S or 21 and the Z-axis controller 30A, without modifying the NC system 17.

Further, since the profile control apparatus 21 and 30A according to the present invention is associated with the central controller 33 of the NC system 17, it is possible to prevent the head from being dropped at the edge of the workpiece or in a throughhole, by interrupting the profile control operation at these positions in response to the commands applied from the NC system.

Further, since the reference distance $L_o$ supplied from the central controller 33 to the Z-axis controller 30A, it is possible to adjust the reference voltage $V_o$ applied to the Z-axis controller 30a according to the kind of material or machining.

Figure 5:
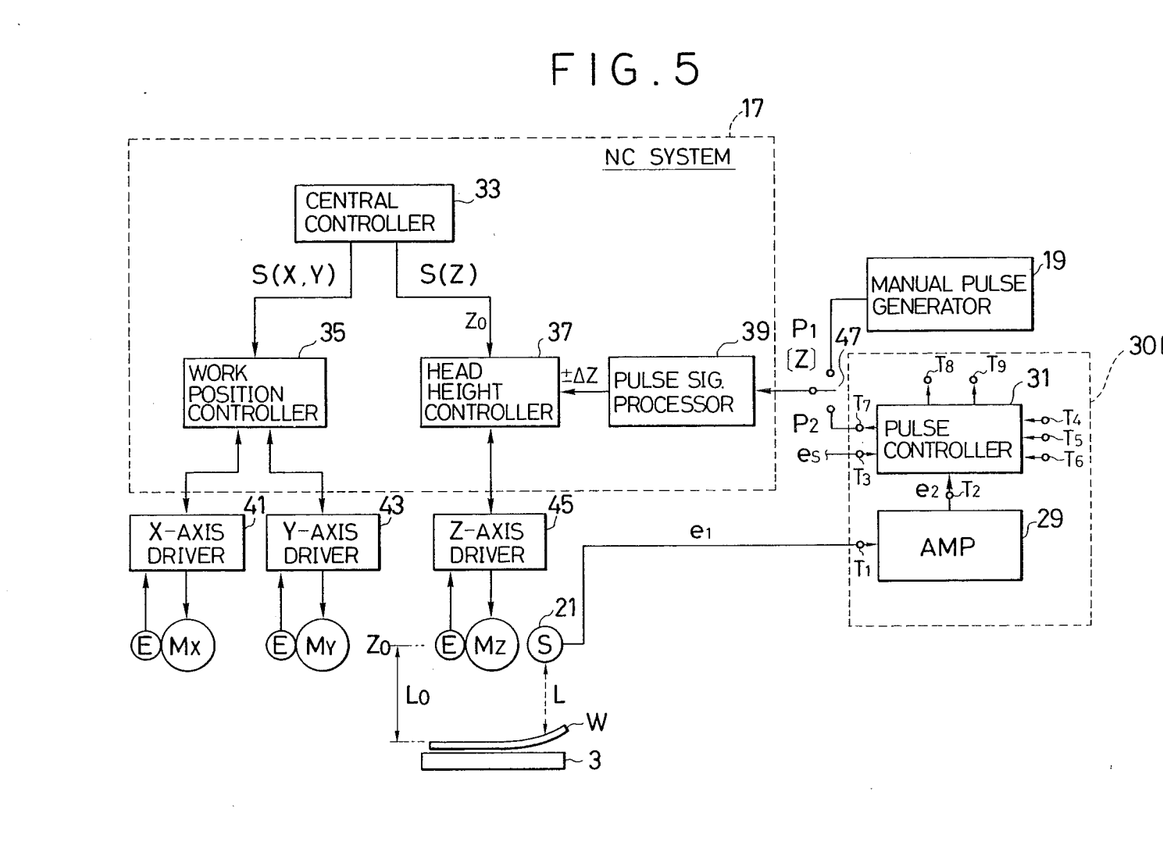
FIG. 5 is a schematic block diagram showing an NC system and a second embodiment of the profile control apparatus according to the present invention.

FIG. 5 shows a second embodiment of the profile control apparatus according to the present invention, in which the Z-axis controller 30B comprises an amplifier circuit 20 and a pulse controller 31. The basic functions of the Z-axis controller 30B are the same as those of the z-axis controller 30A shown in FIG. 2. However, in this second embodiment, voltages corresponding to an upper limit-distance, a lower limit distance and a distance range are preset in addition to the reference distance. Further, the pulse controller 31 includes the functions the same as those of the differential voltage detector 28 and the pulse signal generator 32 both shown in FIG. 2.

Figure 6:
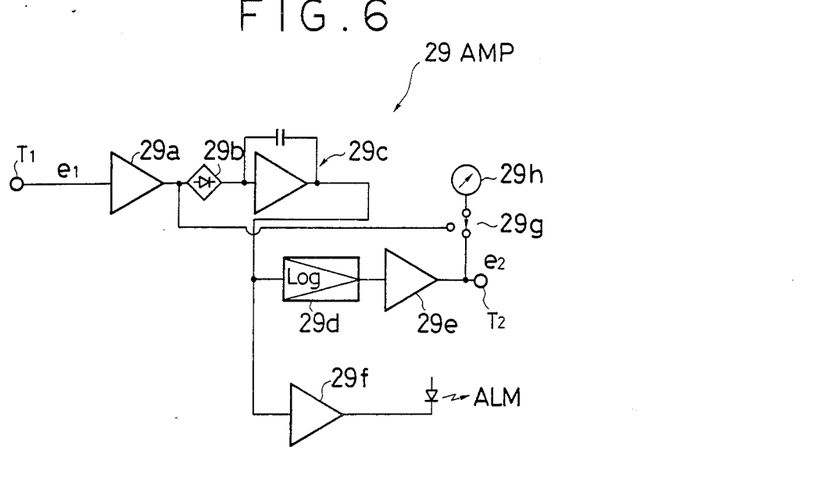
FIG. 6 is a detailed circuit diagram of the amplifier circuit shown in FIG. 5.

FIG. 6 shows a circuit of the amplifier circuit 29 for amplifying an output voltage $e_1$ of the sensor 21. The amplifier circuit 29 includes an amplifier 29a, a rectifier 29b, a smoothing circuit 29c, a LOG amplifier 29d, another amplifier 29e, and an alarm output amplifier 29f.

A sensor voltage $e_1$ is amplified by the amplifier 29a, rectified by the rectifier 29b, and smoothed by the smoothing circuit 29c. The LOG amplifier 29d corrects the input voltage from the smoothing circuit 29c so that the output voltage from the LOG amplifier 29d is roughly proportional to the detected distance L. This is because the sensor voltage is not proportional to the distance L. The corrected voltage is amplified by the amplifier 29e and outputted to the succeeding stage 31 via a terminal T2 as an amplified voltage $e_2$. An alarm ALM is produced from the alarm amplifier 29f only when an abnormally high voltage is detected.

Further, the terminal T2 and the output terminal of the amplifier 29e are selectively connected to a meter 29h via a switch 29g to indicate the amplifier voltage so that the operator can adjust the sensor sensitivity.

Figure 7:
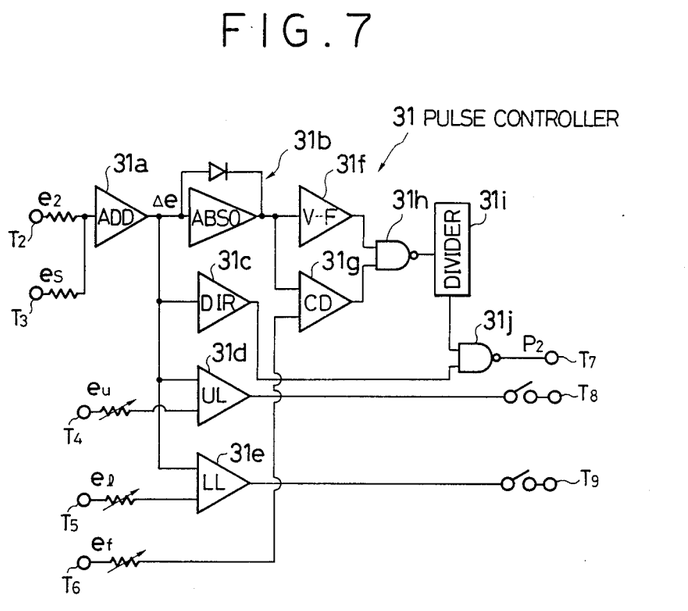
FIG. 7 is a detailed circuit diagram of the pulse controller shown in FIG. 5.

FIG. 7 shows a pulse controller 31 for converting a voltage $e_2$ outputted from the amplifier 29 into a predetermined pulse signal to be applied to the NC system 17. To allow the voltage $e_2$ to be applicable to a general purpose NC system, the pulse controller 31 is of a somewhat complicated type since the voltage $e_2$ cannot simply be converted into the pulse signal P2.

The pulse controller 31 includes an adder amplifier 31a, an absolute value amplifier 31b, a direction discriminator 31c, an upper limit presetting comparator 31d, a lower limit presetting comparator 31e, a V-F converter 31f connected to the absolute value amplifier 31b, and a profile distance range presetting comparator 31g. In addition, a NAND gate 31h is connected to the outputs of the V-F converter 31f and the profile distance range presetting comparator 31g. A divider 31i is connected to the output of the NAND gate 31h. Another NAND gate 31j is connected to the outputs of the divider 31i and the direction discriminator 31c.

A reference voltage $e_s$ for presetting a reference profile distance is set through an input terminal T3. When a profile distance $L_o$ between the sensor 21 and the workpiece W is 1.5 mm, for instance, in FIG. 5, this reference voltage $e_s$ is a sensor voltage (e.g. 2.5 V) obtained when the sensor 21 is located at this position $L_o = 1.5$ mm distance away from the workpiece W. This voltage $e_s$ is set from the NC system.

A voltage $e_u$ corresponding to an upper limit distance and a voltage $e_l$ corresponding to a lower limit distance in profile control operation are both set through the input terminals T4 and T5, respectively. These two valves are ±1 mm, for instance, relative to the reference distance $L_o$.

A voltage $e_f$ for determining a profile distance range is set through the input terminal T6. This value is ±1 mm, for instance. In this embodiment, a positive voltage value $e_f$ corresponding to an absolute value 1 mm is set, for instance.

The adder amplifier 31a receives a sensor voltage $e_2$ and a reference voltage $e_s$ through the input terminals T2 and T3, respectively, and obtains a difference $\Delta e = e_s - e_2$ between the two.

The absolute amplifier 31b amplifies the absolute value of the differential voltage $\Delta e$ and outputs the amplifier absolute differential voltage to the V-F converter 31f and the profile distance range presetting comparator 31g.

The V-F converter 31f generates a pulse signal with a frequency proportional to the differential voltage $\Delta e$ and outputs the pulse signal to the NAND gate 31h. Although not shown, a Zener diode for restricting the differential voltage change determined by a control distance (about ±200 μm) is disposed in this V-F converter 31f, and, in addition, a limiter for limiting the differential voltage is disposed therein. By these elements, the sensitivity of the V-F converter 31f is safely improved so as to output a high frequency pulse signal in response to a low differential voltage while limiting the differential voltage.

One input terminal of the distance range presetting comparator 31g is connected to the input terminal T6. Therefore, when the output of the absolute amplifier 31b lies within the distance range $e_f$ of the profiling operation, the comparator 31g outputs a "1"-level signal. When the output of the absolute amplifier 31b exceeds the voltage $e_f$, the comparator 31g outputs a "0"-level signal. Therefore, the NAND gate 31h outputs a pulse signal with a predetermined frequency to the divider 31i only when the output voltage of the absolute value amplifier 31b lies within the voltage $e_f$ which determines the profiling distance range (±1 mm).

The direction discriminator 31c detects the positive or negative sign of the voltage $\Delta e$ outputted from the amplifier 31a, and applies the detected sign signal to one input terminal of the NAND gate 31j, while an output pulse signal from the divider 31i is applied to the other input terminal of the NAND gate 31j. Therefore, the NAND gate 31j adds a positive or negative sign to the pulse signal applied from the divider 31i on the basis of the positive or negative sign applied from the direction discriminator 31c.

FIG. 8 shows the frequency characteristics of the pulse signal P2 outputted from the NAND gate 31j. As depicted, the frequency of the pulse signal P2 outputted through the terminal T7 rises at a sharp gradient from the reference voltage $e_s$ (at zero point) in proportion to the detected voltage $e_2$ indicative of the distance $\Delta L = L_o - L$. Further, the pulse signal P2 is saturated out of a distance range CD corresponding to the restricted voltage of the V-F converter 31f and further symmetrical with respect to the origin (i.e. the zero profile point). Numerically, the controllable distance range CD (±200 μm) corresponds to ±n kHz (n:1 to 3). Further, the dashed line shown in FIG. 8 indicates the characteristics of the ordinary V-F converter with a relatively low frequency gradient with respect to the voltage.

Figure 9:
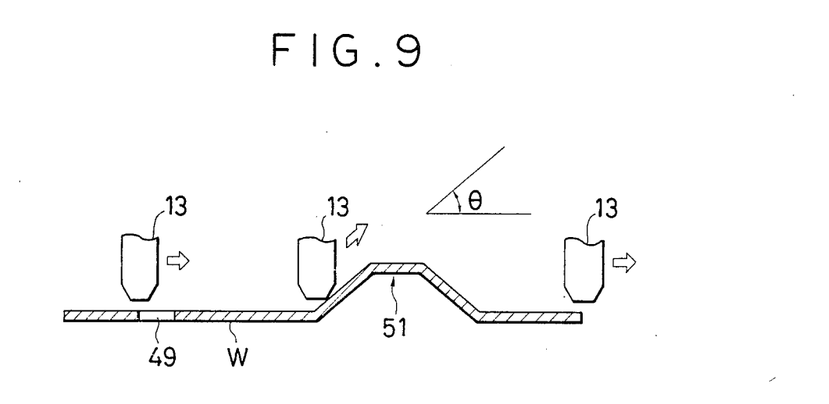
FIG. 9 is an illustration for assistance in explaining the mutual positional relationship between the working head and the workpiece.

The Z-axis servosystem has a predetermined loop gain, while the X- and Y-axis servosystems move a workpiece to and fro on an X- and -Y surface at a speed in accordance with the predetermined program. Therefore the profile error E in the Z-axis direction can be expressed as $$E = (V_F/G_S) \cdot \tan \theta$$

where $V_F$ denotes a moving speed of the workpiece or the working head on the X-Y surface; $G_s$ denotes the loop gain of the Z-axis servosystem; and $\theta$ denotes the profiling angle or the inclination of the workpiece (See FIG. 9). Therefore, the error E increases in proportion to tan $\theta$ when $G_s$ is set to a predetermined value with respect to the workpiece speed $V_F$. On the other hand, when tan $\theta$ is constant, it is possible to reduce the error E by increasing the loop gain Gs.

In order to reduce the above profile error E and to converge the head to a target profile point at a high speed, it is preferable to allow the V-f conversion characteristics corresponding to the loop gain Gs to be non-linear as shown in FIG. 8. That is, the feedback loop gain Gs is increased sharply near the target profile point and saturated out of a predetermined range. The saturated frequency is the maximum frequency at which the NC system is responsive and operative. The feature of the second embodiment is to provide the above V-F converter characteristics of so-called Z-type as depicted in FIG. 8.

With reference to FIG. 7 again, the upper limit comparator 31$d$ compares the voltage $\Delta e$ with the voltage $e_u$, and outputs a high-level signal through the terminal T8 when the distance between the head 13 and the workpiece W is beyond the upper limit. In the same way, the lower limit comparator 31$e$ compares the voltage $\Delta e$ with the voltage $e_1$, and outputs a high-level signal through the terminal T9 when the distance between the two is below the lower limit.

FIG. 9 shows an example where the head 13 moves over the workpiece W in the rightward direction while keeping a distance 1.5 mm from the workpiece W. In this example, the workpiece W is formed with a throughhole 49 and a convex portion 51.

In the apparatus according to the present invention, since the frequency of the pulse signal P2 outputted from the pulse controller 31 is set sufficiently high, it is possible to reduce the delay (caused by the inclination $\theta$) of the feedback pulse signal to be supplied to the pulse signal processor 39.

Further, in the case in which the throughhole 49 is formed in the workpiece W, although the sensor 21 detects the table position under the throughhole 49, since the lower limit comparator 31$e$ is provided, the apparatus outputs a signal indicative of the detection of the lower limit distance to the NC system 17 through the terminal T9. Therefore, the NC system controls the head 13 so that the head passes over the hole 49 without adjusting the head height or without implementing the profile control operation.

Further, when the head 13 reaches the end of the workpiece W as shown on the extreme right side in FIG. 9, in the same way the apparatus outputs a signal indicative of the detection of the lower limit distance to the NC system 17 through the terminal T9. In this case, it is also possible to interrupt the NC system control operation where necessary, because it is possible to readily determine whether the head reaches a hole or an edge, on the basis of the workpiece external dimension data and the machining position data, whenever the lower limit distance is detected.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A profile control apparatus of a thermal working machine for automatically maintaining a distance between a working head and a non-flat workpiece at a constant reference distance, which comprises:

(a) a NC system having a central controller having an automatic mode, a manual pulse generator, a pulse signal processor, a head height controller and a servosystem, for determining a manual working head height from the workpiece in response to a manual pulse signal generated by the manual pulse generator in manual mode and a reference working head height from the workpiece in response to a reference head height command signal generated by the central controller automatic mode;

(b) sensor means for detecting an actual distance between the head and the workpiece; and (c) Z-axis controller means for generating a pulse signal having a frequency proportional to a differential voltage between the reference head height determined by the central controller and the actual distance detected by said sensor means and outputting the pulse signal to the pulse signal processor of said NC system to correct the reference head height so that the actual distance between the head and the non-flat workpiece is automatically regulated to the constant reference distance, the pulse signal being integrated by the pulse signal processor to obtain a head movement distance command, the integrated head movement distance command being added to the reference working head height by the head height controller to drive the servosystem.

2. A profile control apparatus of a thermal working machine for automatically maintaining a distance between a working head and a non-flat workpiece at a constant distance, which comprises:

(a) a manual pulse generator including an encoder, for generating a manual pulse signal with a frequency proportional to a rotational speed of the encoder and with a sign indicative of a rotational of the encoder;

(b) an NC system having:
  (1) a central controller for generating a reference head height command signal indicative of a reference distance between the head and a flat workpiece,
  (2) a pulse signal processor for generating a head movement distance command by integrating the number of the pulses generated by said manual pulse generator; and
  (3) a head height controller for generating a drive signal in response to the reference head height command signal generated by said central controller in automatic mode and in response to the pulse signal generated by said manual pulse generator in manual mode;

(c) a Z-axis servosystem having a servomotor driver, a servomotor and an encoder for automatically controlling the distance between the head and the workpiece on the basis of the drive signal generated by said head height controller;

(d) sensor means for detecting an actual distance between the head and the non-flat workpiece; and (e) Z-axs controller means for generating a pulse signal having a frequency proportional to a voltage representative of a difference between the reference head height command signal from said central controller and the actual distance signal detected by said sensor and outputting said pulse signal to said pulse signal processor of said NC system in place of the manual pulse signal in the automatic mode.

3. The profile control apparatus as set forth in claim 1, wherein said Z-axis controller means comprises:
(a) a differential voltage detector for calculating a difference between the reference distance and the actual distance in voltage level; and
(b) a pulse signal generator for generating a pulse signal having a frequency proportional to the calculated differential voltage, the generated pulse signal being integrated for each unit time by the pulse signal processor of said NC system to obtain a head height movement signal to be applied to the head height controller.

4. The profile control apparatus as set forth in claim 3, wherein said pulse signal generator comprises:
(a) a voltage-frequency converter for generating a pulse signal with a frequency proportional to the calculated differential voltage at a high proportional constant; and
(b) a Zener diode for limiting the frequency when the differential voltage exceeds a predetermined value within a controllable distance range to obtain V-F characteristics of the Z-type.

5. The profile control apparatus as set forth in claim 3, wherein said pulse signal generator further comprises upper limit presetting means for generating an upper limit signal to said NC system to interrupt the profile control operation when the calculated differential voltage is beyond a predetermined value.

6. The profile control apparatus as set forth in claim 3, wherein said pulse signal generator further comprises lower limit presetting means for generating a lower limit signal to said NC system to interrupt the profile control operation when the calculated differential voltage is below a predetermined value.

7. The profile control apparatus as set forth in claim 3, wherein said pulse signal generator further comprises direction discriminating means for detecting either of positive and negative signs of the calculated differential voltage.

8. The profile control apparatus as set forth in claim 3, wherein said pulse signal generator further comprises profile control distance range presetting means for allowing the pulse signal to be outputted to the pulse signal processor only when the calculated differential voltage lies within a predetermined range.

9. The profile control apparatus as set forth in claim 3, wherein said pulse signal generator further comprises an amplifier having an alarm generator for generating an alarm when the detected differential voltage exceeds a predetermined level.

10. A profile control apparatus of a thermal working machine provided with an NC system for determining a manual working head height from a workpiece in response to a manual pulse signal generated by a manual pulse generator, which comprises:
(a) sensor means for detecting an actual distance between a head and the workpiece;
(b) Z-axis controller means for generating a pulse signal indicative of a head height difference between a reference head height determined by the NC system and the actual distance detected by said sensor means to the NC system to correct the reference head height so that the actual distance between the head and the non-flat workpiece can automatically be regulated to the constant reference distance, and
(c) switch means for selectively connecting the manual pulse generator and said Z-axis controller means to the NC system for permitting both manual and automatic head height adjustment operations.

* * * * *

UNITED STATES PATENT AND TRADEMARK OFFICE
CERTIFICATE OF CORRECTION

PATENT NO. : 4,739,235

DATED : April 19, 1988

INVENTOR(S) : ATSUSHI AIKAWA et al

It is certified that error appears in the above-identified patent and that said Letters Patent is hereby corrected as shown below:

Column 3, line 1, "shown" should be --showing--;

Column 4, line 10, "y-axis" should be --Y-axis--;

line 10, "MX" should be --Mx--;

Column 6, line 39, "z-axis" should be --Z-axis--;

line 62, "20" should be --29--;

line 64, "z-axis" should be --Z-axis--;

Column 7, line 56, "valves" should be --values--;

Column 9, line 6, "V-f" should be --V-F--.

Column 10,
Claim 2, line 36, after "rotational" insert --direction--;

UNITED STATES PATENT AND TRADEMARK OFFICE
CERTIFICATE OF CORRECTION

PATENT NO. : 4,739,235

DATED : April 19, 1988

INVENTOR(S) : Atsushi Aikawa et al.

It is certified that error appears in the above-identified patent and that said Letters Patent is hereby corrected as shown below:

Column 10, Claim 2, line 60, "Z-axs" should read -- Z-axis --.

Signed and Sealed this

Twenty-seventh Day of September, 1988

Attest:

DONALD J. QUIGG

*Attesting Officer*   *Commissioner of Patents and Trademarks*